United States Patent
Arias

(10) Patent No.: US 10,164,342 B2
(45) Date of Patent: Dec. 25, 2018

(54) COMPACT WIFI ANTENNA WITH A METAMATERIAL REFLECTOR

(71) Applicant: PARROT DRONES, Paris (FR)

(72) Inventor: Arnaud Arias, Massy (FR)

(73) Assignee: PARROT DRONES, Paris (FR)

(*) Notice: Subject to any disclaimer, the term of this patent is extended or adjusted under 35 U.S.C. 154(b) by 56 days.

(21) Appl. No.: 15/619,480

(22) Filed: Jun. 10, 2017

(65) Prior Publication Data
US 2017/0358864 A1    Dec. 14, 2017

(30) Foreign Application Priority Data
Jun. 14, 2016    (FR) ..................................... 16 55504

(51) Int. Cl.
| | | |
|---|---|---|
| H01Q 1/28 | (2006.01) | |
| H01Q 9/42 | (2006.01) | |
| F41H 5/02 | (2006.01) | |
| F41H 5/04 | (2006.01) | |
| G08C 17/02 | (2006.01) | |
| H01Q 1/32 | (2006.01) | |
| H04B 1/38 | (2015.01) | |
| H04M 1/725 | (2006.01) | |
| H01Q 15/00 | (2006.01) | |

(52) U.S. Cl.
CPC ................. H01Q 9/42 (2013.01); F41H 5/02 (2013.01); F41H 5/0414 (2013.01); G08C 17/02 (2013.01); H01Q 1/28 (2013.01); H01Q 1/32 (2013.01); H01Q 15/0086 (2013.01); H04B 1/38 (2013.01); H04M 1/725 (2013.01)

(58) Field of Classification Search
CPC ........ H01Q 9/0407; H01Q 9/065; H01Q 9/16; H01Q 9/42; H01Q 1/28; H01Q 15/008–15/0086; H01Q 21/00
See application file for complete search history.

(56) References Cited

U.S. PATENT DOCUMENTS

| | | | |
|---|---|---|---|
| 2014/0097995 A1* | 4/2014 | McKinzie, III | ...... H01Q 9/0407 343/793 |
| 2015/0270622 A1* | 9/2015 | Takasaki | ................ H01Q 5/385 343/797 |
| 2016/0156090 A1 | 6/2016 | Campione et al. | |

FOREIGN PATENT DOCUMENTS

| | | |
|---|---|---|
| KR | 20150107434 | 9/2015 |
| WO | WO2016/047779 | 3/2016 |

\* cited by examiner

*Primary Examiner* — Dameon E Levi
*Assistant Examiner* — Hasan Z Islam
(74) *Attorney, Agent, or Firm* — Steven M. Greenberg, Esq.; Shutts & Bowen LLP

(57) ABSTRACT

A compact antenna for centimetric frequency bands includes an active planar element forming a radiator, coupled to an input of a receiver circuit and/or to the output of an emitter circuit, and a passive planar element forming a reflector. The passive planar element is formed by a periodic structure of the metamaterial type comprising a network of resonating cells, in particular cells of the complementary concentric slit-ring type Complementary Split-Ring Resonator (CSRR). A clip-shaped support made of a dielectric material supports the active planar element and the passive planar element.

12 Claims, 2 Drawing Sheets

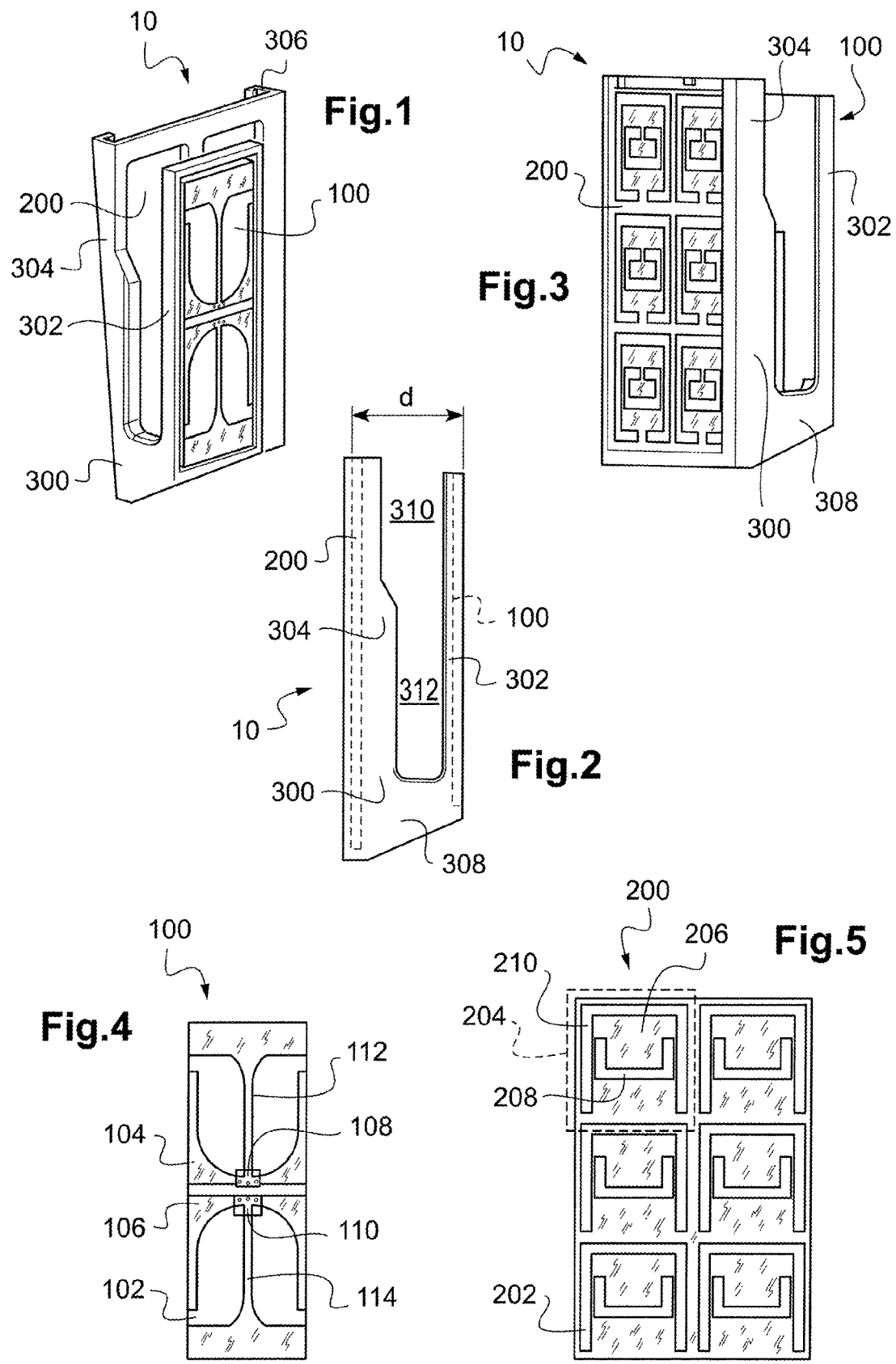

COMPACT WIFI ANTENNA WITH A METAMATERIAL REFLECTOR

CROSS REFERENCE TO RELATED APPLICATIONS

This application claims priority under 35 U.S.C. § 119(a) to French Patent Application Serial Number 1655504, filed Jun. 14, 2016, the entire teachings of which are incorporated herein by reference.

BACKGROUND OF THE INVENTION

Field of the Invention

The present invention relates to remote piloting of motorized devices, and more precisely, to radiocommunication antennas used by such devices for remote piloting thereof.

Description of the Related Art

There are many types of motorized devices including drones. Drones may include flying drones, with rotary wing or fixed wing or land based drones traversing the ground under the control of a remote operator. Typical examples of flying drones are the BEBOP™ of Parrot SA, Paris, France, which is a rotary-wing drone of the quadricopter type, or the DISCO™, also of Parrot SA, which a fixed-wing drone of the "flying-wing" type. Another type of drone is the JUMPING SUMO™, also of Parrot SA, which is a remote-controlled rolling and jumping toy.

Published Patent Cooperation Treaty request WO 2010/061099 A2, European Patent Application Publication EP 2 364 757 A1, European Patent Application Publication EP 2 450 862 A1 and European Patent Application Publication EP 2 613 213 A1 each de-scribe the principle of piloting a drone by means of a touch-screen multimedia telephone or tablet having integrated accelerometers, for example a smartphone or a tablet, executing a specific remote-control applicative software program such as, in the above-mentioned example, the mobile application FREEFLIGHT™ of Parrot SA.

This telephone or tablet may possibly be relayed by a specific remote-control device such as the SKYCONTROLLER™ of Parrot SA, which is a console interfaced with the telephone or the tablet in the form of a box provided with two handles with joysticks and various buttons for an ergonomic piloting by the user in the same way as a dedicated remote-control console. The device further includes an emitter/receiver acting as a relay between the telephone, the tablet and the drone, the emitter being provided with an amplifier for increasing the power radiated to the radio channel used between the remote control and the drone. These aspects of the radio communication between console and drone are described, in particular, in European Patent Application Publication EP 3 020 460 A1.

Generally, a drone remote-control device incorporates the various control elements required for the detection of the drone piloting commands and for the bidirectional exchange of data via a radio link of the Wi-Fi (IEEE 802.11) or Bluetooth wireless local network type directly established with the drone. This bidirectional radio link includes a downlink (from the drone to the remote control) to transmit data frame containing a video stream coming from a camera on board the drone and flight data or state indicators of the drone, as well as an uplink (from the remote control to the drone) to transmit the piloting commands.

One may realize that the quality of the radio link between the remote control and the drone is an essential parameter, in particular to ensure a satisfying range. Indeed, the volumes of data transmitted are significant, in particular due to the very high need in video bitrate of the downlink (typically of the order of 2.5 to 3 Mbit/second), so that any degradation of the radio link quality will have an impact on the transmission quality and consequently on the radio range, with moreover a risk of sporadic losses on the data and the commands exchanged.

At the drone, the radio link uses one or several antennas incorporated to the drone, which, in reception, pick up the signals emitted by the remote-control device and, in emission, radiate the power of the high frequency (HF) emitter circuit supporting the downlink, in particular for the transmission of the video flow and flight data signals. Today, the drones generally use, as WiFi antennas, dipole-type antennas, in particular formed of two dipoles coupled to two respective antenna terminals of the WiFi radio chip. This dipole-based structure of antenna has however for drawback a rather irregular radiation pattern, having in particular gain dips in the dipole axis.

Moreover, if a reflector is associated with the dipole to optimize the radiation pattern thereof, to obtain a maximum efficiency, this reflector must be placed at a distance of $\lambda/2$ of the radiating element (i.e. about 60 mm for a frequency located around 2.4 GHz) and have a size of about $\lambda$ (i.e. about 120 mm), which make the unit bulky and difficult to integrate into a very compact device such as a drone.

BRIEF SUMMARY OF THE INVENTION

It is an object of the present invention to propose a new structure of antenna device typically adapted to centimetric frequency bands such as WiFi bands, which compensates for the drawbacks exposed hereinabove of the antennas used up to now, by providing in particular a radiation pattern that is both extended and homogeneous in a very wide sector of a hemispherical half-space. In particular, the matter is to design an antenna whose radiation properties are the less possible affected by potential metallic elements located on the rear of the antenna, i.e. in the hemispherical half-space opposed to that in which the antenna radiates.

Another object of the invention is to design such an antenna structure whose reduced size allows it to be easily integrated into a drone, with no protruding element that would increase the drag of the drone, and that does not represent a significant mass liable to needlessly make the drone heavier.

One aspect of the invention involves using as a passive element of the antenna (reflector) a structure of a so-called "metamaterial" type, a term that designates in fact a periodic structure or array of resonating cells that, functionally, actually acts as a homogeneous material but has original electromagnetic properties which could not be found in a natural material. In particular, from the electromagnetism point of view, the metamaterials are liable to have both a negative permittivity ($\varepsilon$) and a negative permeability ($\mu$). Though it has been proposed to use periodic structures of the metamaterial type for the making of active antenna elements (radiators), as described for example by T Khanum et al., "A Compact Wideband Sierpinski Antenna Loaded with Metamaterial", International Conference on Electrical, Electronics, and Optimization Techniques (ICEEOT), 2016, pp. 348-351 and though Published PCT Reques WO 2016/047779 A1 describes another example of antenna comprising an active element consisted of an array of metamaterial cells arranged remote from a metallic ground plane and though the use of metamaterials has also been proposed to make antenna ground planes, in the present invention, the metamaterial is used neither as an active antenna element nor as a ground plane, but as a reflector, i.e. as a purely passive element.

Indeed, Korean published patent application KR 2015 0107434 describes an antenna using as a reflector (passive element) a metallic ground plane in front of which is arranged, at a short distance, an array of printed phase-shifter cells constituting a metamaterial. The metamaterial has for effect to modify the propagation of the waves in the vicinity of the metallic plane and to provide a very high directivity. The matter is actually in this proposition to replace the cup-shaped reflector of the conventional parabolic antennas by a flat reflector nevertheless providing a very directive radiation pattern, at least as much as with the conventional parabolic antennas. Such a reflector is easy to integrate and, moreover, if made on a flexible support, may be rolled to facilitate the transport of the antenna.

The object aimed at by the present invention, however, is opposite to that of Korean published patent application KR 2015 0107434, insofar as the problem consists in obtaining, as exposed hereinabove, a radiation pattern that is wide and homogeneous, and hence the less directive possible, in a very wide sector of hemispherical half-space (typically a sector of at least 140° aperture). For that purpose, the invention proposes a compact structure of antenna for centimetric frequency bands, in particular WiFi bands, comprising as in the above-mentioned KR 2015 0107434 A, an active element forming a radiator coupled to an input of a receiver circuit and/or an output of an emitter circuit, and a passive planar element comprising a periodic structure made of a metamaterial with an array of resonating cells, these cells resonating at a predetermined resonance frequency comprised in at least one of said frequency bands.

Characteristically of one aspect of the invention, the active element is a planar element comprising at least one dipole tuned on a frequency located in one of said frequency bands, and the periodic structure made of a metamaterial forms a reflector extending in a second plane parallel to a first plane supporting the active planar element and located at a distance from the latter, the radiation pattern of the antenna being a wide-aperture sectorized pattern.

Thus, according to various advantageous subsidiary characteristics:
the passive planar element forming a reflector is devoid of ground plane cooperating with the array of resonating cells of the metamaterial;
the antenna further includes a support made of a dielectric material, generally clip or staple shaped, comprising said first plane supporting the active planar element, said second plane supporting the passive planar element, and a central element connecting said first and second planes;
the resonating cells are cells of the concentric slit-ring type, Split-Ring Resonator (SRR), especially cells of the complementary concentric slit-ring type, Complementary Split-Ring Resonator (CSRR);
the periodic structure made of a metamaterial includes a network of two columns of resonating cells;
the distance separating the first plane and the second plane of the support is lower than 10% of a half-wavelength corresponding to said predetermined resonance frequency, in particular this distance is lower than 8 mm for a predetermined resonance frequency located in the 2.4-GHz band;
the active planar element includes a first U-shaped dipole, tuned on a frequency located in a first band of said frequency bands, advantageously completed by a second T-shaped dipole, tuned on a frequency located in a second band of said frequency bands, the second band being different from said first frequency band; and
the radiation pattern of the antenna is a tore-sector wide-aperture pattern included in a hemispheric domain, advantageously an aperture of at least 140°.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a three-quarter front perspective view of an antenna according to the invention.

FIG. 2 is a lateral elevation view of the antenna of FIG. 1.

FIG. 3 is a three-quarter rear perspective view of the antenna of FIGS. 1 and 2.

FIG. 4 shows, in isolation, the active planar element forming a radiator of the antenna of FIGS. 1 to 3.

FIG. 5 shows, in isolation, the passive planar element forming a reflector of the antenna of FIGS. 1 to 3.

DETAILED DESCRIPTION OF THE INVENTION

Figure 6:
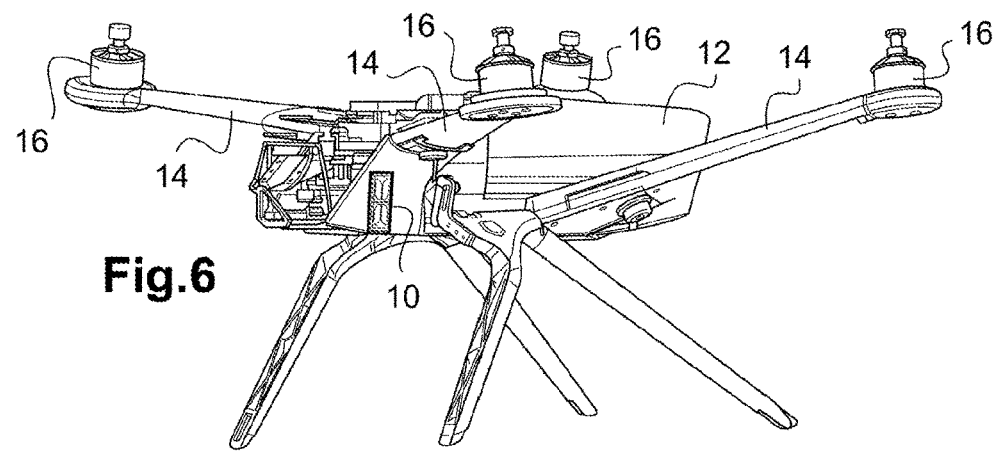
FIG. 6 illustrates how to integrate into the body of a drone an antenna such as that described in FIGS. 1 to 3.

FIGS. 1 to 5 illustrate an exemplary embodiment of the antenna of the invention that, as indicated hereinabove, is particularly well adapted to centimetric frequency bands such as WiFi bands (2.40 GHz-2.4835 GHz and 5.15 GHz-5.85 GHz).

This application, although being particularly advantageous because responding to precise problems in particular in the field of antennas for drones, is however not limitative, and the configuration of antenna of the invention may be used in other fields and for other applications.

The antenna 10 according to the invention is illustrated under various angles in FIGS. 1 to 3.

This antenna 10 is essentially formed of two antenna elements 100, 200, i.e. an active planar element forming a radiator 100 (shown in isolation in FIG. 4) and a passive planar element forming a reflector 200 (shown in isolation in FIG. 5). These two elements 100, 200 are arranged relative to each other in a precise geometric configuration thanks to an element 300 made of a dielectric material, forming a support, which defines the distance of separation, the parallelism and the centering of the elements 100 and 200 relative to each other. The support element 300 also allows, as will be seen hereinafter with reference to FIGS. 6 and 7, an easy mounting on a device, for example a drone, using this antenna.

The elements 100 and 200 are advantageously made in a planar shape or patch by etching of a conductive surface of a printed circuit board (PCB) so as to form a desired particular conductive pattern defining the antenna element.

Hence, the active element forming a radiator 100 is made from a PCB 102 on which metallized patterns have been formed so as to define a first dipole 104, 106 that is coupled in 108, 110 to an input of a receiving circuit and/or an output of an emitter circuit (the antenna being intended equally to the emission or to the reception of radiofrequency signals).

This first dipole 104, 106 is advantageously conformed, as in the example illustrated, so as to have a U-shape, which allows enlarging the bandwidth about the central frequency and also reducing the width size of this dipole. This first dipole 104, 106 is tuned on a first frequency band, for example the lower, 2.4-GHz WiFi band (frequency band comprised between 2.40 and 2.4835 GHz).

The element 100 also includes a second dipole 112, 114, advantageously configured in a T-shape, tuned on a second frequency band, for example the upper, 5-GHz WiFi band (frequency of 5.15 GHz to 5.85 GHz).

The passive element forming a reflector 200 is, characteristically of the invention, consisted of a simple structure of the "metamaterial" type, a term that designates, as indicated in introduction, a periodic structure or array of resonating cells that, functionally, actually acts as a homogeneous material but has original electromagnetic properties which could not be found in a natural material—in particular a negative permittivity ($\varepsilon$) and a negative permeability ($\mu$). It is to be noted that the metamaterial constitutes on its own the reflector of the antenna, which has no ground plane nor functionally similar element.

FIG. 5 illustrates in isolation, to constitute this passive element, a periodic structure of the metamaterial type, particularly well adapted to the contemplated use as a WiFi antenna in association with the active element 100 described hereinabove.

The passive element forming a reflector 200 is made on a PCB 202 on which have been etched patterns allowing defining an array of identical cells 204, in the example illustrated an array of two columns of three cells 204.

Each cell 204 includes a metallisation 206 etched so as to define a resonating element 208, each cell resonating at a predetermined resonance frequency.

The cells 204 may be cells of the concentric slit-ring type, SRR, Split-Ring Resonator, where the fact that the ring is slit provides a resonance at a wavelength that is very higher than the diameter of the ring, with hence a possibility of very significant miniaturization.

Preferably, the cells 204 used within the framework of the invention are cells of the complementary concentric slit-ring type, CSRR, Complementary Split-Ring Resonator, which have the double advantage that the reflector element 200 can be placed closer to the radiating element 100 than with SRR cells (in which it is the electric field that resonates), and that the overall size of the reflector can also be reduced.

The CSRR cells 204 can be cells with both round or square rings, the choice of square rings (as in the example illustrated) providing a highest compactness for the reflector 200.

The size of each cell is calculated so as to resonate at a precise frequency, which, in the illustrated case, is a frequency located in the 2.4-GHz WiFi band (the fact that the CSRR cells do not resonate specifically in the 5-GHz band has actually no noticeable effect on the global result obtained).

The overall size of the reflector element 200, which conditions in particular the number of columns of CSRR cells 204 of the network and the number of cells in each column, is determined as a function of the size of the radiating active element 100 so that the size of the reflector element 200 is higher than that of the radiating element 100.

In particular, insofar as with the described configuration we have a high field at the ends of the dipole, it is necessary that the overall size of the reflector includes at least the length of the radiating dipole.

Moreover, having a reflector with a more extended size than that of the radiating element 100 provides a better protection against undesirable effects that the near environment (metal parts, etc.) could have on the global radiation pattern of the antenna.

In the illustrated example, the reflector is consisted of two columns of three CSRR cells 204, for an very reduced overall size of $\Box/6 \times \Box/4$, i.e. 22 mm×33 mm at 2.4 GHz, herein associated with a radiating element 100 of size 10 mm×29 mm, keeping an extremely compact character for the unit.

The two elements 100 and 200 that have just been described are kept parallel to each other and remote from each other by a support part 300 made of a dielectric material, for example a plastic material.

The part 300 may in particular have a U shape, with two parallel branches 302, 304 receiving the elements 100 and 200 of the antenna, for example in suitable housings (see for example through the groove 306 visible in FIG. 1 for the reflector 200).

The spacing d between the active element 100 forming a radiator and the passive element 200 forming a reflector is of the order of $\Box/15$, i.e. 7 to 8 mm for an antenna tuned to the 2.4-GHz band.

We hence have an extremely compact structure, with a reflector far closer to the radiator than in a conventional structure (indeed, in a conventional structure, the spacing between reflector and radiator must be of the order of a half-wavelength, i.e. about 50 to 60 mm for a frequency located around 2.4 GHz and corresponding to a half-wavelength of 62.5 mm).

The two branches 302, 304 of the U are connected together by a central element 308 giving to the unit a general clip or staple shape that can be easily nested in a wall of a device, as in the configuration that will be described hereafter with reference to FIGS. 6 and 7. The central recess of the clip then advantageously includes an enlarged distal portion 310 to facilitate the insertion of the clip and a narrower proximal portion 312 ensuring the clamping of the antenna 10 with the element on which it is clipped.

Figure 7:
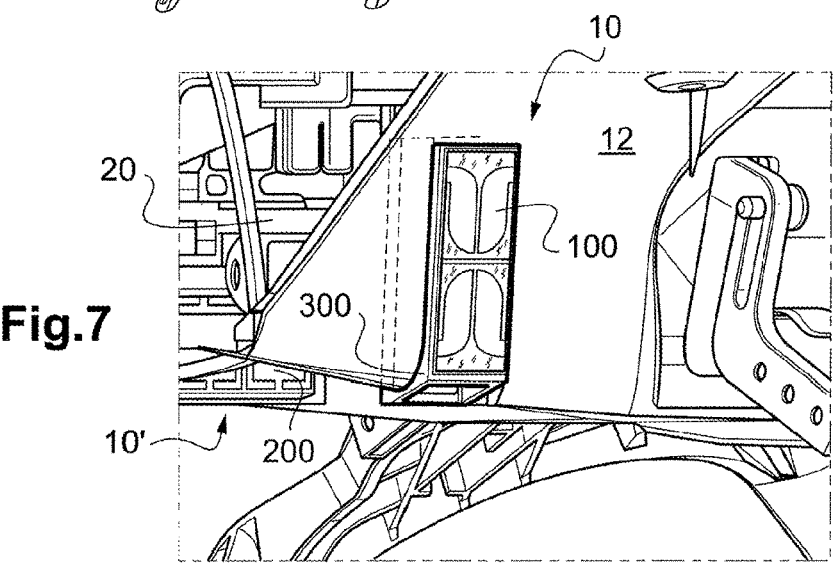
FIG. 7 is an enlarged view of FIG. 6, showing the detail of the antenna and how the latter is configured with respect to the various elements of the drone.

FIGS. 6 and 7 illustrate an example of integration of an antenna 10 such as that which has just been described with reference to FIGS. 1 to 5, in an equipment such as a drone.

The illustrated drone is of the quadricopter type, with a body 12 and four arms 14 each bearing a motor 16 liable to drive a propeller into rotation.

In the illustrated example, the drone is provided with two lateral antennas 10, 10', located on the front of the drone, each antenna having the U-shaped support clipped on a wall 18 of the drone body 12. The wall 18 is made of a dielectric material, for example a plastic material.

The active part 100 of the antenna forming a radiator is turned towards the outside, and the reflector 200 is interposed between, on the one hand, the active radiating element 100 and, on the other hand, various metallic parts 20 of the drone that, otherwise, would be liable to have an influence on the geometry of the radiation pattern of the antenna.

It is to be moreover noted that this configuration, in addition to its extremely compact character, allows, due to the planar shape, an easy integration in a complex mechanical environment, without compromise on the radioelectric performance of the antenna.

Measurements performed with the antenna of the invention show that the latter radiates in a wide-aperture sectorized pattern included in a hemispherical half-space, typically a sectorized pattern of at least about 140° aperture, moreover advantageously of toroidal shape, with a relatively homogeneous radiation level over the whole sector.

By providing a drone with three antennas according to the invention (antennas 10 and 10', plus a third antenna arranged in a ventral area of the drone), it is possible to ensure with these three 140°-sectorized antennas a satisfying communication between a drone and a distant remote-control apparatus, with homogeneous radio performances whatever the orientation of the drone with respect to the remote-control apparatus.

Moreover, the radiation pattern limited to a hemispherical half-space allows making the antenna insensitive to the metallic elements located behind the reflector, unlike usually used WiFi antennas that undergo a noticeable degradation of radiated power and of homogeneity of the radiation pattern due to these disturbing elements, which may lead to very noisy communications between the drone and the remote-control apparatus in certain flight configurations.

In other words, the reflector desensitizes the active element of the antenna relative to the disturbances liable to be introduced by the metallic parts and else located behind the antenna.

The measurements also show that the just-mentioned pattern properties are substantially equivalent in the two 2.4-GHz and 5-GHz WiFi bands.

Figure 8:
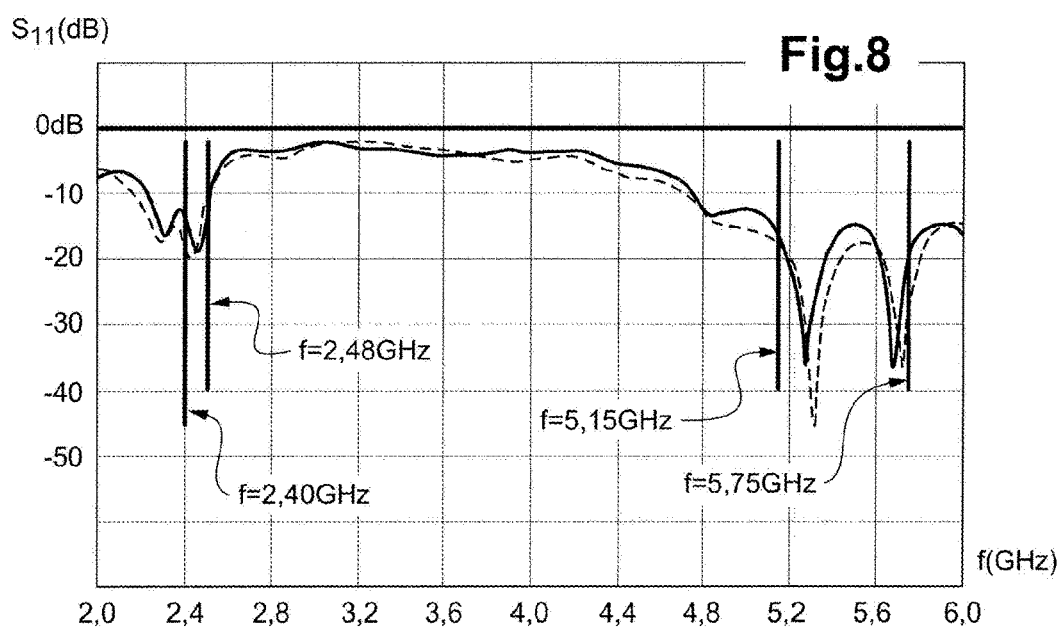
FIG. 8 is a diagram showing the variation of the parameter $S_{11}$ describing the electric behaviour of the antenna of the invention as a function of the emission/reception frequency.

FIG. 8 is a diagram showing the variation of the parameter $S_{11}$ describing the electric behaviour of the antenna of the invention (radiator+reflector unit) as a function of the emission/reception frequency in the two 2.40-2.48-GHz and 5.15-5.75-GHz WiFi bands, for the two antennas located on the left and on the right of the drone (as can be seen, even if the electromagnetic context is slightly different for the two units, $S_{11}$ remains steady). More precisely, the resonance peak of the reflector alone corresponds to the first dip of the curve in the 2.40-GHz band, whereas that of the radiator alone corresponds to the second dip of the same curve.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A compact antenna for centimetric frequency bands, in particular for WiFi bands, the antenna comprising:
    an active element forming a radiator, coupled to an input of a receiver circuit and/or to an output of an emitter circuit; and
    a passive planar element formed by a periodic structure made of a metamaterial comprising an array of resonating cells, said cells resonating at a predetermined resonance frequency comprised in at least one of said frequency bands,
    wherein, the active element is a planar element comprising at least one dipole tuned on a frequency located in one of said frequency bands, and
    wherein the periodic structure made of the metamaterial forms a reflector extending in a second plane parallel to a first plane supporting the active planar element and located at a distance from the latter, the radiation pattern of the antenna being a wide-aperture sectorized pattern.

2. The antenna of claim 1, wherein the passive planar element forming a reflector is devoid of ground plane cooperating with the array of resonating cells of the metamaterial.

3. The antenna of claim 1, further comprising:
    a support made of a dielectric material, that is generally either clip or staple shaped, the support comprising said first plane supporting the active planar element, said second plane supporting the passive planar element, and a central element connecting said first and second planes.

4. The antenna of claim 1, wherein said resonating cells are cells of a concentric slit-ring type Split-Ring Resonator (SRR).

5. The antenna of claim 4, wherein said resonating cells are cells of the complementary concentric slit-ring type Complementary Split-Ring Resonator (CSRR).

6. The antenna of claim 1, wherein said periodic structure made of the metamaterial comprises a network of two columns of resonating cells.

7. The antenna of claim 2, wherein the distance separating the first plane and the second plane of the support is lower than 10% of a half-wavelength corresponding to said predetermined resonance frequency.

8. The antenna of claim 7, wherein the distance separating the first plane and the second plane of the support is lower than 8 mm for a predetermined resonance frequency located in the 2.4 GHz band.

9. The antenna of claim 1, wherein the active planar element comprises a first U-shaped dipole, tuned on a frequency located in a first band of said frequency bands.

10. The antenna of claim 9, wherein the active planar element (100) comprises a second T-shaped dipole, tuned on a frequency located in a second band of said frequency bands, the second band being different from said first frequency band.

11. The antenna of claim 1, wherein the radiation pattern of the antenna is a tore-sector pattern included in a hemispheric domain.

12. The antenna of claim 11, wherein the aperture of said pattern is of at least 140°.

\* \* \* \* \*